United States Patent
Hirose et al.

(10) Patent No.: US 11,909,038 B2
(45) Date of Patent: Feb. 20, 2024

(54) NEGATIVE ELECTRODE ACTIVE MATERIAL, NEGATIVE ELECTRODE, LITHIUM ION SECONDARY BATTERY, METHOD OF PRODUCING NEGATIVE ELECTRODE ACTIVE MATERIAL, AND METHOD OF PRODUCING LITHIUM ION SECONDARY BATTERY

(71) Applicant: SHIN-ETSU CHEMICAL CO., LTD., Tokyo (JP)

(72) Inventors: Takakazu Hirose, Annaka (JP); Reiko Sakai, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/339,429

(22) PCT Filed: Aug. 23, 2017

(86) PCT No.: PCT/JP2017/030123
§ 371 (c)(1),
(2) Date: Apr. 4, 2019

(87) PCT Pub. No.: WO2018/074053
PCT Pub. Date: Apr. 26, 2018

(65) Prior Publication Data
US 2019/0237760 A1   Aug. 1, 2019

(30) Foreign Application Priority Data

Oct. 21, 2016   (JP) ................... 2016-207212

(51) Int. Cl.
*H01M 4/02* (2006.01)
*H01M 4/36* (2006.01)
(Continued)

(52) U.S. Cl.
CPC ............. *H01M 4/48* (2013.01); *C01B 33/113* (2013.01); *H01M 4/131* (2013.01); *H01M 4/36* (2013.01);
(Continued)

(58) Field of Classification Search
CPC .......... H01M 4/48; H01M 4/36; H01M 4/131; H01M 10/0525; H01M 10/058;
(Continued)

(56) References Cited

U.S. PATENT DOCUMENTS

| | | | |
|---|---|---|---|
| 5,395,711 A | 3/1995 | Tahara et al. | |
| 6,432,585 B1 * | 8/2002 | Kawakami | H01M 4/244 429/233 |

(Continued)

FOREIGN PATENT DOCUMENTS

| | | |
|---|---|---|
| CN | 101276912 A | 10/2008 |
| CN | 102544573 A | 7/2012 |

(Continued)

OTHER PUBLICATIONS

Zhou et al., Chemical Bonding in amorphous Si-coated carbon nanotubes as anodes for Li ion batteries: a XANES study, RSC Advances, 2014, 4, pp. 20226-20229. (Year: 2014).*

(Continued)

*Primary Examiner* — Christian Roldan
(74) *Attorney, Agent, or Firm* — Oliff PLC

(57) ABSTRACT

A negative electrode active material containing a negative electrode active material particle; the negative electrode active material particle including a silicon compound shown by $SiO_x$ (0.5≤x≤1.6), and having a peak in a range of 539 to 541 eV in a XANES spectrum obtained by XANES measurement of the negative electrode active material particle. This provides a negative electrode active material that is capable of increasing battery capacity and improving cycle (Continued)

performance when it is used as a negative electrode active material for a secondary battery.

11 Claims, 2 Drawing Sheets

(51) Int. Cl.
| | | |
|---|---|---|
| *H01M 4/38* | (2006.01) | |
| *H01M 4/48* | (2010.01) | |
| *H01M 4/62* | (2006.01) | |
| *H01M 4/131* | (2010.01) | |
| *H01M 10/0525* | (2010.01) | |
| *C01B 33/113* | (2006.01) | |
| *H01M 10/058* | (2010.01) | |

(52) U.S. Cl.
CPC ..... *H01M 10/058* (2013.01); *H01M 10/0525* (2013.01); *H01M 2004/021* (2013.01); *H01M 2004/027* (2013.01)

(58) Field of Classification Search
CPC ..... H01M 2004/021; H01M 2004/027; H01M 4/364; H01M 4/1395; H01M 4/134; H01M 4/485; H01M 4/62; H01M 4/366; H01M 4/386; H01M 4/483; H01M 4/587; H01M 4/625; H01M 10/052; C01B 33/113; Y02E 60/10; C01P 2002/85
USPC ............................................................ 429/231
See application file for complete search history.

(56) References Cited

U.S. PATENT DOCUMENTS

| | | |
|---|---|---|
| 7,459,236 B2 | 12/2008 | Konishiike et al. |
| 8,377,592 B2 | 2/2013 | Jeong et al. |
| 2005/0079417 A1* | 4/2005 | Kim .............. H01M 10/0525 429/231.2 |
| 2006/0099507 A1 | 5/2006 | Kogetsu et al. |
| 2007/0190416 A1 | 8/2007 | Yamada et al. |
| 2008/0176137 A1 | 7/2008 | Endo et al. |
| 2008/0236909 A1 | 10/2008 | Morita et al. |
| 2009/0202911 A1 | 8/2009 | Fukuoka et al. |
| 2012/0301786 A1 | 11/2012 | Takamuku et al. |
| 2015/0221950 A1* | 8/2015 | Minami .............. H01M 4/5825 429/223 |
| 2016/0233484 A1 | 8/2016 | Hirose et al. |
| 2017/0288216 A1 | 10/2017 | Kamo et al. |

FOREIGN PATENT DOCUMENTS

| | | |
|---|---|---|
| CN | 105474438 A | 4/2016 |
| CN | 106025220 A | 10/2016 |
| JP | 2997741 B2 | 1/2000 |
| JP | 2001-185127 A | 7/2001 |
| JP | 2002-042806 A | 2/2002 |
| JP | 2006-114454 A | 4/2006 |
| JP | 2006-164954 A | 6/2006 |
| JP | 2007-234255 A | 9/2007 |
| JP | 2007-242590 A | 9/2007 |
| JP | 2008-177346 A | 7/2008 |
| JP | 2008-243674 A | 10/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2009-224145 A | 10/2009 |
| JP | 2011233245 A * | 11/2011 |
| JP | 2015-156355 A | 8/2015 |
| JP | 2016-81707 A | 5/2016 |
| KR | 10-2016-0044478 A | 4/2016 |
| TW | 201635621 A | 10/2016 |

OTHER PUBLICATIONS

Oct. 10, 2017 International Search Report issued in International Application No. PCT/JP2017/030123.
May 4, 2020 Extended Search Report issued in European Patent Application No. 17862977.0.
May 17, 2021 Office Action issued in Korean Patent Application No. 10-2019-7010949.
Jun. 2, 2021 Office Action issued in Taiwanese Patent Application No. 106129300.
Jul. 21, 2021 Office Action and Search Report issued in Chinese Patent Application No. 201780063980.1.
"Chemical bonding in amorphous Si-coated carbon nanotubes as anodes for Li ion batteries: a XANES study", Jigang Zhou, et al., Royal Society of Chemistry, vol. 4, Issue 39, pp. 20226-20229.
Mar. 4, 2022 Office Action issued in Taiwanese Patent Application No. 106129300.
Nov. 17, 2021 Office Action issued in Korean Patent Application No. 10-2019-7010949.
Jan. 14, 2022 Office Action issued in Chinese Patent Application No. 201780063980.1.
Aug. 11, 2022 Office Action issued in European Patent Application No. 17862977.0.
Jul. 8, 2022 Office Action issued in Chinese Patent Application No. 201780063980.1.
Feb. 19, 2023 Office Action issued in Chinese Patent Application No. 201780063980.1.
D. J. Wallis, et al., "Oxygen k near-edge spectra of amorphous silicon suboxides," Journal of Microscopy, vol. 180, pp. 307-312.
Nov. 22, 2022 Office Action issued in Chinese Patent Application No. 201780063980.1.
Nov. 15, 2023 Office Action issued in Chinese Patent Application No. 201780063980.1.

* cited by examiner

[FIG. 1]
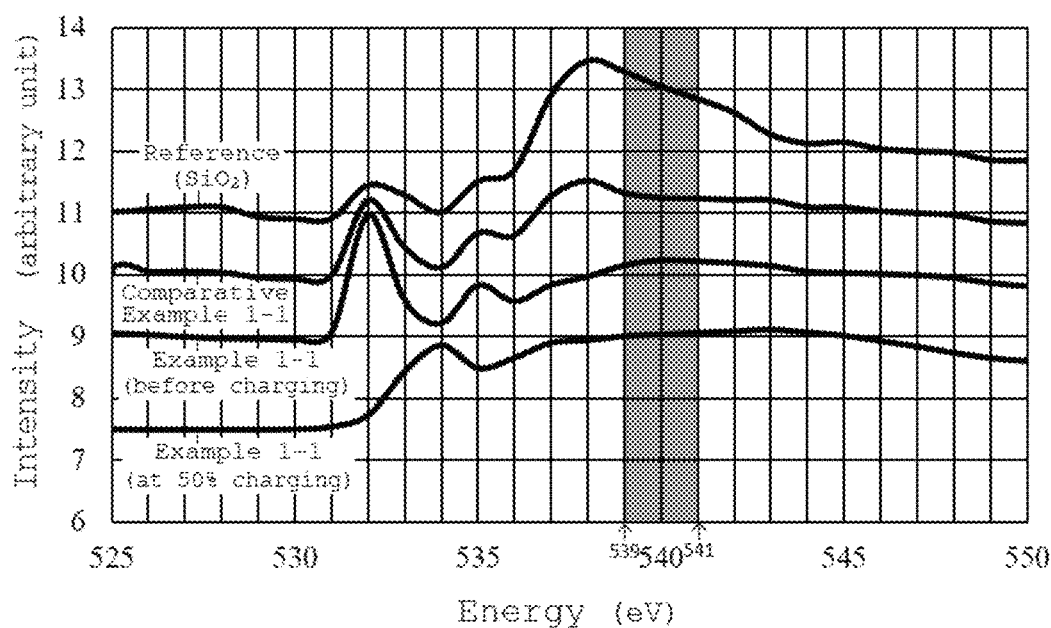
[FIG. 2]
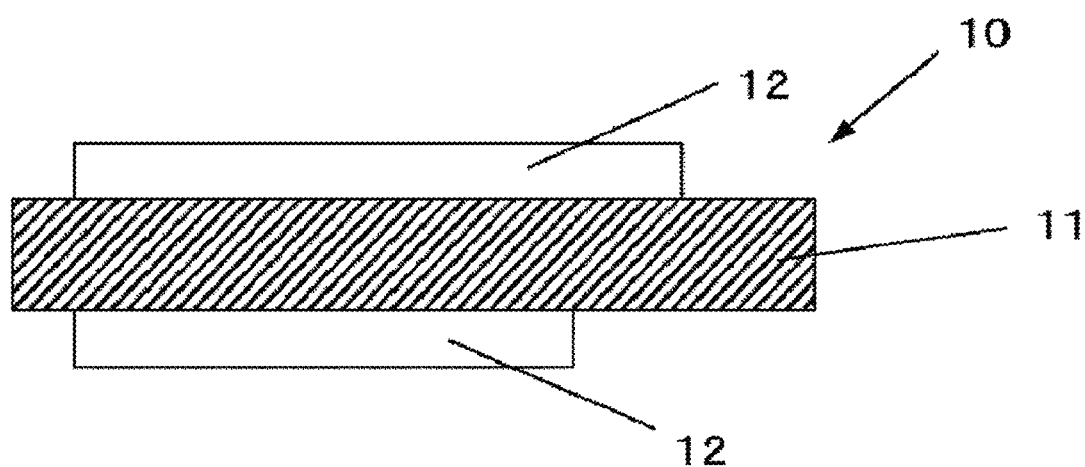

[FIG. 3]
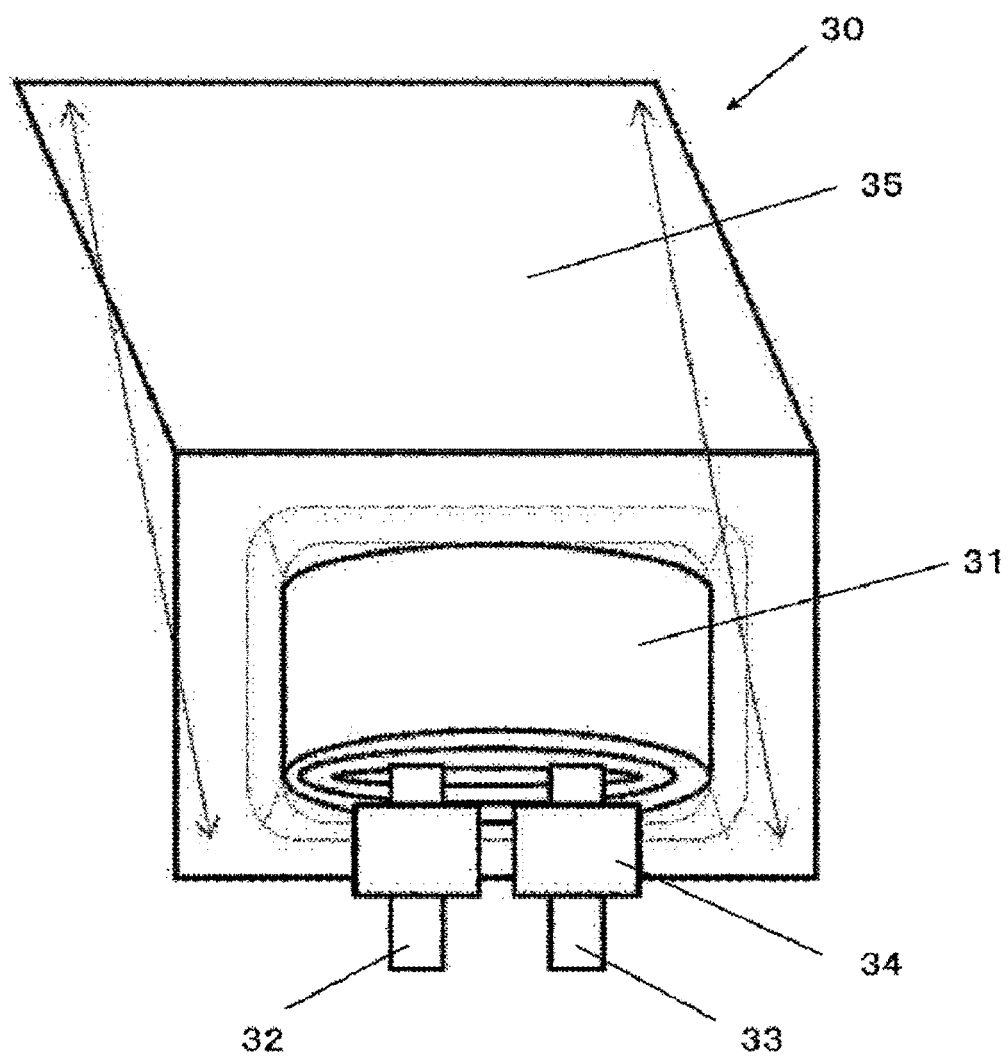

NEGATIVE ELECTRODE ACTIVE MATERIAL, NEGATIVE ELECTRODE, LITHIUM ION SECONDARY BATTERY, METHOD OF PRODUCING NEGATIVE ELECTRODE ACTIVE MATERIAL, AND METHOD OF PRODUCING LITHIUM ION SECONDARY BATTERY

TECHNICAL FIELD

The present invention relates to a negative electrode active material, a negative electrode, a lithium ion secondary battery, a method of producing a negative electrode active material, and a method of producing a lithium ion secondary battery.

BACKGROUND ART

In recent years, small electronic devices, represented by mobile terminals, have been widely used and urgently required to reduce the size and weight and to increase the life. Such requirement has advanced the development of particularly small, lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon-based active material, is required to further improve the battery capacity for recent market requirement. Use of silicon as a negative electrode active material is considered to improve the battery capacity, for silicon has a logical capacity (4199 mAh/g) ten times larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes for carbon-based active materials ranges from a standard application type to an integrated type in which the materials are directly accumulated on a current collector.

Use of silicon as a main material of a negative electrode active material, however, expands or shrinks a negative electrode active material when charging or discharging, thereby making the negative electrode active material easy to break particularly near its surface layer. In addition, this active material produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle performance easy to reduce.

Various materials and configurations of a negative electrode for a lithium-ion secondary battery mainly using a silicon material have been considered to improve the initial efficiency and the cycle performance of the battery.

More specifically, a vapor deposition method is used to accumulate silicon and amorphous silicon dioxide simultaneously so that better cycle performance and greater safety are achieved (See Patent Document 1, for example). Moreover, a carbon material (an electronic conduction material) is disposed on the surface of silicon oxide particles so that a higher battery capacity and greater safety are achieved (See Patent Document 2, for example). Moreover, an active material including silicon and oxygen is produced to form an active material layer having a higher ratio of oxygen near a current collector so that improved cycle performance and higher input-output performance are achieved (See Patent Document 3, for example). Moreover, silicon active material is formed so as to contain oxygen with an average content of 40 at % or less and with a higher oxygen content near a current collector so that improved cycle performance is achieved (See Patent Document 4, for example).

Moreover, a nano-complex including Si-phase, $SiO_2$, $M_yO$ metal oxide is used to improve the first charge and discharge efficiency (See Patent Document 5, for example). To improve the cycle performance, $SiO_x$ ($0.8 \leq x \leq 1.5$, the range of particle size=1 μm to 50 μm) and a carbon material are mixed and calcined at a high temperature (See Patent Document 6, for example). The active material is controlled by adjusting a mole ratio of oxygen to silicon in a negative electrode active material in the range from 0.1 to 1.2 so as to hold a difference between the maximum and the minimum of the oxygen-to-silicon mole ratio near the interface between the active material and a current collector at 0.4 or less, so that improved cycle performance is achieved (See Patent Document 7, for example). Moreover, a metal oxide containing lithium is used to improve the battery load characteristic (See Patent Document 8, for example). To improve the cycle performance, a hydrophobic layer such as a silane compound layer is formed on the surface of a silicon material (See Patent Document 9, for example). Moreover, a silicon oxide is used and coated with graphite coating to give electric conductivity so that improved cycle performance is achieved (See Patent Document 10, for example). In Patent Document 10, the graphite coating exhibits a Raman spectrum that has broad peaks at shift values of 1330 $cm^{-1}$ and 1580 $cm^{-1}$, and their intensity ratio $I_{1330}/I_{1580}$ satisfies $1.5 < I_{1330}/I_{1580} < 3$. Similarly, a particle having a silicon microcrystal phase dispersed in a silicon dioxide is used to achieve a higher battery capacity and improved cycle performance (See Patent Document 11, for example). Moreover, a silicon oxide having a silicon-to-oxygen atomicity ratio of 1:y ($0 < y < 2$) is used to improve overcharge and overdischarge performance (See Patent Document 12, for example).

CITATION LIST

Patent Literature

Patent Document 1: Japanese Unexamined Patent publication (Kokai) No. 2001-185127
Patent Document 2: Japanese Unexamined Patent publication (Kokai) No. 2002-042806
Patent Document 3: Japanese Unexamined Patent publication (Kokai) No. 2006-164954
Patent Document 4: Japanese Unexamined Patent publication (Kokai) No. 2006-114454
Patent Document 5: Japanese Unexamined Patent publication (Kokai) No. 2009-070825

Patent Document 6: Japanese Unexamined Patent publication (Kokai) No. 2008-282819
Patent Document 7: Japanese Unexamined Patent publication (Kokai) No. 2008-251369
Patent Document 8: Japanese Unexamined Patent publication (Kokai) No. 2008-177346
Patent Document 9: Japanese Unexamined Patent publication (Kokai) No. 2007-234255
Patent Document 10: Japanese Unexamined Patent publication (Kokai) No. 2009-212074
Patent Document 11: Japanese Unexamined Patent publication (Kokai) No. 2009-205950
Patent Document 12: Japanese Patent No. 2997741

SUMMARY OF INVENTION

Technical Problem

As described above, small mobile devices, represented by electronic devices, have been advancing recently toward high performance and multifunction, and a lithium ion secondary battery that is main electric source thereof is required to improve a battery capacity. As a technique to solve this problem, it is desired to develop a lithium ion secondary battery containing a negative electrode using a silicon material as a main material. Further, for a lithium ion secondary battery using a silicon material, it is desired to show a cycle performance almost equivalent to that of a lithium ion secondary battery using a carbon-based active material. However, it is not reached the stage to propose a negative electrode active material which shows a cycle stability equivalent to that of a lithium ion secondary battery using a carbon-based active material.

Among the silicon materials, silicon oxide is a material to exhibit good properties, and is nearing application to products actually. However, the silicon oxide undergoes disproportionation to Si and Li by repeating charging and discharging, thereby causing enlargement of Si. Due to this enlargement of Si, the silicon oxide exhibits degradation behavior similar to metallic Si and Si alloy. The silicon oxide allows the battery to largely elongate the cycle performance compared to metallic Si and so on, but has not yet been prevented from degradation due to longer cycle.

The present invention was accomplished in view of the above-described problems. It is an object of the present invention to provide a negative electrode active material that is capable of increasing battery capacity and improving cycle performance when it is used as a negative electrode active material for a secondary battery, a negative electrode containing this negative electrode active material, and a lithium ion secondary battery using this negative electrode. The object also includes to provide a method of producing a negative electrode active material that is capable of increasing battery capacity and improving cycle performance. The object further includes to provide a method of producing a lithium ion secondary battery using such a negative electrode active material.

Solution to Problem

To solve the problem, the present invention provides a negative electrode active material containing a negative electrode active material particle;
the negative electrode active material particle comprising a silicon compound shown by $SiO_x$ ($0.5 \leq x \leq 1.6$), and having a peak in a range of 539 to 541 eV in a XANES spectrum obtained by XANES measurement of the negative electrode active material particle.

The inventive negative electrode active material contains a negative electrode active material particle containing a silicon compound ($SiO_x$: $0.5 \leq x \leq 1.6$; hereinafter, also referred to as silicon oxide), and has high battery capacity thereby. The silicon oxide contained in this negative electrode active material particle actually has a silicon dioxide ($SiO_2$) component and a silicon (Si) component. In the inventive negative electrode active material that contains a negative electrode active material particle having the peak described above, the silicon dioxide component is decreased in long-range order structure. That is, when Li is inserted into the Si—O bond, at least part of the Si—O bonds can be decreased to form a Li—Si bond(s) or an O—Li bond(s). The decrease of long-range order structure of the $SiO_2$ component makes it possible to increase sites for occluding Li and facilitates giving and receiving of Li. As a result, favorable cycle performance is successfully obtained.

It is preferred that the negative electrode active material particle have the strongest peak at the vicinity of 532 eV in the XANES spectrum.

The peak at the vicinity of 532 eV is attributable to Si—O bonds which contribute to occlusion of Li, and is attributable to highly ionic Si—O bonds. The negative electrode active material particle having this peak is capable of increasing sites for occluding Li.

In this case, it is preferred that the negative electrode active material particle exhibit decrease in the peak at the vicinity of 532 eV in occlusion of Li.

In the negative electrode active material like this, the highly ionic Si—O bond(s) are cut through Li occlusion, and a Li—O bond(s) and so on can be formed.

It is preferred that the negative electrode active material particle exhibit generation of a peak at the vicinity of 534 eV in the XANES spectrum in occlusion of Li.

In the negative electrode active material like this, it is considered that part of the Si—O bonds have shifted to a Li—O bond(s) through Li occlusion.

The negative electrode active material particle preferably has a median diameter of 0.5 µm or more and 20 µm or less.

When the median diameter of the negative electrode active material particle is in the above range, more favorable cycle performance as well as initial charge and discharge property are obtained using the negative electrode active material containing the negative electrode active material particle like this as a negative electrode active material for a lithium ion secondary battery.

The negative electrode active material particle preferably has a surface layer portion containing a carbon material.

When the negative electrode active material particle has a carbon material at the surface layer portion as described above, the electric conductivity is improved. Accordingly, it is possible to improve the battery property using a negative electrode active material containing the negative electrode active material particle like this as a negative electrode active material for a lithium ion secondary battery.

In this case, the average thickness of the carbon material is preferably 5 nm or more and 5000 nm or less.

When the average thickness of the carbon material for covering is 5 nm or more, the electric conductivity is successfully improved. When the average thickness of the carbon material for covering is 5000 nm or less, it is possible to prevent lowering of the battery capacity in the use of the negative electrode active material containing the negative electrode active material particle like this as a negative electrode active material for a lithium ion secondary battery.

The present invention further provides a negative electrode comprising the negative electrode active material of the present invention.

When the negative electrode like this is used as a negative electrode for a lithium ion secondary battery, higher battery capacity and favorable cycle performance are obtained.

The present invention further provides a lithium ion secondary battery, comprising the negative electrode of the present invention as a negative electrode.

The lithium ion secondary battery using the negative electrode like this makes it possible to give higher capacity and favorable cycle performance.

The present invention further provides a method of producing a negative electrode active material containing a negative electrode active material particle, comprising:
preparing negative electrode active material particles each containing a silicon compound shown by a general formula $SiO_x$ ($0.5 \leq x \leq 1.6$); and
selecting a negative electrode active material particle having a peak in a range of 539 to 541 eV in a XANES spectrum obtained by XANES measurement of the negative electrode active material particles.

By selecting a negative electrode active material particle as described above in producing a negative electrode active material, it becomes possible to produce a negative electrode active material with higher capacity and favorable cycle performance when it is used as a negative electrode active material for a lithium ion secondary battery.

The present invention further provides a method of producing a lithium ion secondary battery, comprising:
producing a negative electrode using a negative electrode active material produced by the inventive method of producing a negative electrode active material, and
producing a lithium ion secondary battery using the produced negative electrode.

This production process makes it possible to produce a lithium ion secondary battery with higher capacity and favorable cycle performance using the negative electrode active material containing the negative electrode active material particle selected as described above.

Advantageous Effects of Invention

The inventive negative electrode active material brings high capacity and favorable cycle performance when it is used as a negative electrode active material for a lithium ion secondary battery. The inventive method of producing a negative electrode active material makes it possible to produce a negative electrode active material for a lithium ion secondary battery with favorable cycle performance.

BRIEF DESCRIPTION OF DRAWINGS

FIG. 1 shows XANES spectra measured in Reference ($SiO_2$), Comparative Example 1-1, Example 1-1 (before charging), and Example 1-1 (at 50% charging);

FIG. 2 is a sectional view showing an example of configuration of the inventive negative electrode;

FIG. 3 is an exploded diagram showing an example of configuration of the inventive lithium ion secondary battery (a laminate film type).

DESCRIPTION OF EMBODIMENTS

Hereinafter, embodiments of the present invention will be described, but the present invention is not limited thereto.

As described above, a negative electrode mainly made of a silicon-based material has been investigated to be used as a negative electrode of a lithium ion secondary battery as a method to increase the battery capacity of lithium ion secondary battery. The lithium ion secondary battery using this silicon material is required to have cycle performance that is close to that of a lithium ion secondary battery using a carbon-based active material. However, it has not yet been proposed a negative electrode active material that gives cycle performance equal to that of lithium ion secondary battery using a carbon-based material.

Accordingly, the inventors have diligently investigated a negative electrode active material that gives favorable cycle performance when it is used as a negative electrode of a lithium ion secondary battery. As a result, the inventors have found that higher battery capacity and favorable cycle performance are obtained by using a negative electrode active material containing a negative electrode active material particle; the negative electrode active material particle containing a silicon compound shown by $SiO_x$ ($0.5 \leq x \leq 1.6$), and having a peak in a range of 539 to 541 eV in a XANES spectrum obtained by XANES measurement of the negative electrode active material particle; thereby providing the present invention.

<Negative Electrode>

First, the negative electrode (negative electrode for a non-aqueous electrolyte secondary battery) will be described. FIG. 2 is a sectional view showing an example of configuration of the inventive negative electrode.

[Configuration of Negative Electrode]

As shown in FIG. 2, the negative electrode 10 is constituted to have the negative electrode active material layer 12 on the negative electrode current collector 11. This negative electrode active material layer 12 may be disposed on the both sides or only one side of the negative electrode current collector 11. When the inventive negative electrode active material is used, the negative electrode current collector 11 is not essential.

[Negative Electrode Current Collector]

The negative electrode current collector 11 is made of a highly electric conductive and mechanically strong material. Examples of the electric conductive material used for the negative electrode current collector 11 include copper (Cu) and nickel (Ni). This electric conductive material is preferably a material that does not form an intermetallic compound with lithium (Li).

The surface of the negative electrode current collector 11 may or may not be roughed. Examples of the negative electrode current collector roughened include a metallic foil subjected to an electrolyzing process, an embossing process, or a chemical etching process. Examples of the negative electrode current collector that is not roughened include a rolled metallic foil.

[Negative Electrode Active Material Layer]

The negative electrode active material layer 12 contains the inventive negative electrode active material, which is capable of occluding and releasing lithium ions. In view of battery design, other materials may be further contained, such as a negative electrode binding agent (binder) or a conductive assistant agent.

The inventive negative electrode active material contains a negative electrode active material particle. The inventive negative electrode active material particle has a core portion that is capable of occluding and releasing a lithium ion. When the negative electrode active material particle has a surface layer portion containing a carbon material, the particle further has carbon covering portion to give electric conductivity.

The inventive negative electrode active material contains a negative electrode active material particle containing a silicon compound ($SiO_x$: $0.5 \leq x \leq 1.6$). Accordingly, high battery capacity is provided. The silicon oxide contained in this negative electrode active material particle actually has a silicon dioxide ($SiO_2$) component and a silicon (Si) component.

The inventive negative electrode active material has a peak in a range of 539 to 541 eV in a XANES spectrum obtained by an X-ray Absorption Near-Edge Structure (XANES) measurement of the negative electrode active material particle. In the inventive negative electrode active material that contains a negative electrode active material particle having the peak described above, the silicon dioxide component is decreased in long-range order structure. That is, when Li is inserted into the Si—O bond, at least part of the Si—O bonds can be decreased to form a Li—Si bond(s) or an O—Li bond(s). The decrease in long-range order of $SiO_2$ component makes it possible to increase sites for occluding Li and to facilitate giving and receiving of Li. As a result, favorable cycle performance is successfully obtained. The peak in a range of 539 to 541 eV is attributable to an Si—O bond, and has higher covalent bonding property at higher energy region.

In this case, it is desirable that the negative electrode active material particle have the strongest peak at the vicinity of 532 eV (e.g., 531.5 eV or more and 532.5 eV or less) in the XANES spectrum in addition to the peak described above. The strongest peak herein means the strongest peak in a prescribed energy (eV) range in a XANES spectrum, for example. Illustrative examples of the prescribed range include 525 eV or more and 550 eV or less. It is to be noted that the peak at the vicinity of 532 eV and the peak in the range of 539 to 541 eV herein are obtained by XANES measurement of the negative electrode active material particle before charging and discharging. That is, these peaks characterize a so-called green material.

Hereinafter, the relationship between a XANES spectrum and an Si—O bond will be specified. First, in O k-edge XAFS measurement, stronger Si—O bond exhibits a peak at higher energy range (e.g., at the vicinity of 538 eV) in a XANES spectrum. In this case, the Si—O bond is considered to have longer bond distance, larger oxygen valence number, and stronger covalent bonding property. When the Si—O bond has stronger covalent bonding property as described above, the Si—O bond hardly occludes Li. On the other hand, weaker Si—O bond exhibits a peak at lower energy range (e.g., at the vicinity of 532 eV) in a XANES spectrum. In this case, the Si—O bond is considered to have shorter (nearer) bond distance, smaller oxygen valence number, and stronger ionic bonding property. As described above, the peak at the vicinity of 532 eV indicates that the oxygen in the Si—O bond is in a state of lower valence number, in which case, the Si—O bond has shorter bond distance (is close to ionic bonding property, having charge deviation) and higher reactivity with Li. Accordingly, the negative electrode active material particle having a peak at the vicinity of 532 eV makes it possible to increase sites for occluding Li. Incidentally, the above relations between a XANES spectrum and an Si—O bond is summarized in Table 1 below.

TABLE 1

| Si—O bond distance | Valence number of oxygen | Bond strength | Peak position in XANES spectrum | Property of bond |
|---|---|---|---|---|
| Long | Large | Strong | Higher energy | Strongly covalent |
| Short | Small | Weak | Lower energy | Strongly ionic |

When the negative electrode active material particle in the present invention has the strongest peak at the vicinity of 532 eV in the XANES spectrum, this negative electrode active material particle is preferably one in which the peak at the vicinity of 532 eV is decreased as Li is occluded. In the negative electrode active material like this, the highly ionic Si—O bonds can be cut to form a Li—O bond(s) and so on as Li is occluded.

The negative electrode active material particle in the present invention, is preferably one in which a peak at the vicinity of 534 eV (e.g., 533.5 eV or more and 534.5 eV or less) is generated in the XANES spectrum as Li is occluded. In the negative electrode active material like this, it is considered that part of the Si—O bonds are shifted to a Li—O bond(s) as Li is occluded.

More specifically, it is desirable that the peak at the vicinity of 532 eV be decreased and the peak at the vicinity of 534 eV be generated as Li is occluded. This is because part of the Si—O bonds come to have a Li—O bond(s) as Li is occluded, thereby making it possible to occlude Li by Si. As the method of determining the decrease of the peak at the vicinity of 532 eV and the generation of a peak at the vicinity of 534 eV, although it is not limited to a particular method, the following method is usable. First, negative electrode active material particles before charging are subjected to XANES measurement (measurement of XANES region in XAFS measurement). Then, the intensity is determined on the peak at the vicinity of 532 eV in a XANES spectrum obtained by the measurement. Subsequently, the negative electrode active material particles are charged. For example, Li is occluded in an amount corresponding to half of the negative electrode charging capacity (50% charging). That is, the state of charge (SOC) is set to 50%. The method of charging the negative electrode active material particle includes a method of producing a negative electrode that contains negative electrode active material particles, followed by charging a secondary battery that contains the negative electrode. Then, the charged negative electrode active material particles (e.g., a negative electrode containing the particles) are subjected to XANES measurement. Lastly, the XANES spectra of negative electrode active material particles before and after the charging are compared to determine that the peak at the vicinity of 532 eV is decreased and the peak at the vicinity of 534 eV is generated. The negative electrode active material particle in the present invention is more preferably one in which the peak at the vicinity of 532 eV is disappeared and the peak at the vicinity of 534 eV is generated at 50% charging.

The median diameter ($D_{50}$: the particle size at the cumulative volume of 50%) of the negative electrode active material particle is not particularly limited, but is preferably 0.5 μm or more and 20 μm or less. When the median diameter is in the above range, it becomes easy to occlude and release a lithium ion in charging and discharging, and the particle is prevented from breakage. When the median diameter is 0.5 μm or more, it is possible to decrease the surface area per mass to prevent increase of battery irreversible capacity. On the other hand, when the median diameter is 20 μm or less, the particle is prevented from breakage, and is prevented from forming a new surface thereby.

The negative electrode active material particle preferably has a surface layer portion containing a carbon material.

The negative electrode active material particle, containing a carbon material in the surface layer portion like this, is improved in electric conductivity. Accordingly, using a negative electrode active material containing the negative electrode active material particle like this as a negative electrode active material of a lithium ion secondary battery, the battery properties are successfully improved.

The average thickness of the carbon material is preferably 5 nm or more and 5000 nm or less.

When the average thickness of the carbon material for covering is 5 nm or more, the electric conductivity is improved. When the average thickness of the carbon material for covering is 5000 nm or less, it is possible to prevent lowering of the battery capacity in case of using a negative electrode active material containing the negative electrode active material particle like this as a negative electrode active material of a lithium ion secondary battery.

The average thickness of this carbon material can be calculated by the following procedure, for example. First, the negative electrode active material is observed through transmission electron microscope (TEM) at an optional magnification. This magnification is preferably a magnification by which the thickness of carbon material can be determined visually so as to measure the thickness. Subsequently, the thicknesses of carbon material are measured at 15 random points. In this case, it is preferable to set the measuring points widely and randomly as possible without focusing a particular place. Lastly, the average value of the thicknesses of carbon material at the 15 points are calculated.

The covering rate of carbon material is not particularly limited, but is desirable to be as high as possible. The covering rate of 30% or more improves the electric conductivity further, and is preferable. The method for covering the carbon material is not particularly limited, but a method of carbonizing saccharide and a pyrolysis method of hydrocarbon gas are preferable since they can improve the covering rate.

As the negative electrode binder contained in the negative electrode active material layer 12, any one or more of polymer material, synthetic rubber, and so on are usable, for example. Illustrative examples of the polymer material includes polyvinylidene fluoride, polyimide, polyamideimide, aramid, polyacrylic acid, lithium polyacrylate, and carboxymethyl cellulose. Illustrative examples of the synthetic rubber includes styrene-butadiene rubber, fluororubber, and ethylene-propylene-diene.

As the negative electrode conductive assistant agent, any one or more of a carbon material, such as carbon black, acetylene black, graphite, ketjen black, carbon nanotube, and carbon nanofiber can be used.

The negative electrode active material layer 12 may contain a carbon-based active material in addition to the inventive negative electrode active material (silicon-based active material). This makes it possible to lower electric resistance of the negative electrode active material layer 12 and to ease expansion stress due to charging. Illustrative examples of this carbon-based active material includes pyrolytic carbons, cokes, glassy carbon fiber, baked organic polymer compound, and carbon black.

The negative electrode active material layer 12 is formed by an application method, for example. The application method is a method in which a silicon-based active material is mixed with the above binder and so on, optionally with a conductive assistant agent or a carbon-based active material, and then dispersed to organic solvent, water, or the like so as to be applied.

[Method of Producing Negative Electrode]

The negative electrode 10 can be produced by the following procedures, for example. First, a method of producing a negative electrode active material used for a negative electrode will be described. In the beginning, negative electrode active material particles each containing a silicon compound shown by a general formula $SiO_x$ (0.5≤x≤1.6) are prepared. This is followed by selecting a negative electrode active material particle having a peak in a range of 539 to 541 eV in a XANES spectrum obtained by XANES measurement of the negative electrode active material particles.

The negative electrode active material particle containing a silicon compound ($SiO_x$: 0.5≤x≤1.6) can be prepared by the following procedure, for example. First, a raw material which generates silicon oxide gas is heated at a temperature range of 900° C. to 1600° C. in a reduced pressure under an inert gas atmosphere to generate silicon oxide gas. In this case, the raw material can be a mixture of metallic silicon powder and silicon dioxide powder. When considering the existence of oxygen on surface of the metallic silicon powder and slight oxygen in a reaction furnace, the mixing molar ratio is desirably in a range of 0.8<metallic silicon powder/silicon dioxide powder<1.3.

Then, the generated silicon oxide gas is solidified and deposited on an absorbing plate (deposition plate). In this case, the temperature of the silicon oxide gas, the gas that concurrently flows with the silicon oxide gas (an inert gas, a reduction gas), or the temperature of the absorbing plate are controlled to successfully prepare a negative electrode active material particle that has the strongest peak at the vicinity of 532 eV and a peak in a range of 539 to 541 eV in a XANES spectrum. That is, it is possible to prepare a negative electrode active material particle that has a peak at lower energy range, which is a peak attributable to a Si—O bond with highly ionic bonding property, and a peak at higher energy range, which is a peak attributable to a Si—O bond with highly covalent bonding property. Subsequently, the deposit of silicon oxide is taken out under the condition of the temperature in the reaction furnace of 100° C. or below, and then the deposit is ground and powdered using a ball mil, a jet mil, or the like. As described above, the negative electrode active material particle is successfully produced. Incidentally, these negative electrode active material particles can be obtained more easily by changing the vaporization temperature of raw material to generate silicon oxide gas, changing the temperature of deposition plate, changing the injection amount of gas (an inert gas, a reduction gas) relative to deposition stream of the silicon oxide gas or the kind thereof, or changing the pressure in a furnace containing silicon oxide gas.

Then, a carbon material is formed on the surface layer portion of the prepared negative electrode active material particle. This step, however, is not essential. As a method for forming the carbon material layer, a thermal decomposition CVD method is desirable. The following describes an example of a method of forming a carbon material layer by thermal decomposition CVD method.

First, the negative electrode active material particle is set into a furnace. Then, hydrocarbon gas is introduced into the furnace, and the temperature in the furnace is increased. The decomposition temperature is not particularly limited, but is desirably 1200° C. or less. The temperature in the furnace is raised to a prescribed temperature, followed by forming carbon material on the surface layer portion of the negative electrode active material particle. The hydrocarbon gas to be a raw material of the carbon material is not particularly limited, but is desirable to have a $C_nH_m$ composition in which n≤3. When n≤3, it is possible to reduce the production cost and to improve the properties of the decomposition products.

The negative electrode active material produced (selected) as described above is mixed with other materials such as a negative electrode binder and a conductive assistant agent to form a negative electrode mixture, followed by adding organic solvent or water to form slurry. Then, the negative electrode mixture slurry is applied to the surface of the negative electrode current collector 11 and is dried to form the negative electrode active material layer 12. In this case, heating press may be performed in accordance with needs. As described above, a negative electrode is successfully produced.

The selection can be performed by producing negative electrode active material particles, followed by taking out the part of them to be subjected to the XANES measurement, and adopting a negative electrode active material particle that satisfies conditions of the present invention. This selection is not necessarily performed in each production of the negative electrode active material particle. When a negative electrode active material particle produced in a specific conditions satisfies the conditions of the present invention, the negative electrode active material particle produced under the same conditions can be determined to have the same properties, and this can be selected to be the negative electrode active material particle. Incidentally, in the selection of a negative electrode active material particle having a peak in a range of 539 to 541 eV, additional selection may be performed by searching whether the particle has the strongest peak at the vicinity of 532 eV or not, whether the peak at the vicinity of 532 eV decreases or not after occluding Li, and/or whether the peak at the vicinity of 534 eV generates or not after occluding Li.

<Lithium Ion Secondary Battery>

Then, the inventive lithium ion secondary battery will be described. The inventive lithium ion secondary battery uses the inventive negative electrode described above as a negative electrode. Here exemplifies a lithium ion secondary battery of a laminate film type as a concrete example.

[Configuration of Laminate Film Secondary Battery]

The laminate film lithium ion secondary battery 30 shown in FIG. 3 mainly includes a wound electrode body 31 stored in sheet-shaped outer parts 35. This wound body is formed by winding a positive electrode, a negative electrode, and a separator disposed between these electrodes. There is also a case storing a laminate having a separator disposed between a positive electrode and a negative electrode. The electrode bodies of both types have a positive-electrode lead 32 attached to the positive electrode and a negative-electrode lead 33 attached to the negative electrode. The outermost circumference of the electrode bodies is protected by a protecting tape.

The positive-electrode lead and the negative-electrode lead, for example, extends from the interior of the outer parts 35 toward the exterior in one direction. The positive-electrode lead 32 is made of, for example, a conductive material such as aluminum; the negative-electrode lead 33 is made of, for example, a conductive material such as nickel or copper.

An example of the outer part 35 is a laminate film composed of a fusion-bond layer, a metallic layer, and a surface protecting layer stacked in this order. Two laminate films are fusion-bonded or stuck with an adhesive at the outer edge of their fusion-bond layers such that each fusion-bond layer faces the wound electrode body 31. The fusion-bond layer may be, for example, a film such as a polyethylene or polypropylene film; the metallic layer may be aluminum foil, for example; the protecting layer may be nylon, for example.

The space between the outer parts 35 and the positive and negative electrode leads is filled with close adhesion films 34 to prevent air from entering therein. Exemplary materials of the close adhesion films include polyethylene, polypropylene, and polyolefin resins.

[Positive Electrode]

The positive electrode has a positive electrode active material layer disposed on one side or both sides of a positive electrode current collector as in the negative electrode 10 shown in FIG. 2, for example.

The positive electrode current collector is made of, for example, a conductive material such as aluminum.

The positive electrode active material layer contains any one kind or two kinds of positive electrode materials capable of occluding and releasing lithium ions, and may contain a binder, a conductive assistant agent, a dispersing agent, or other materials according to design. The same detailed description as described for the negative electrode binders and negative electrode conductive assistant agent, for example, is then given for the binder and the conductive assistant agent.

The positive electrode material is preferably a compound containing lithium. Examples of the lithium-containing compound include a complex oxide composed of lithium and a transition metal element, and a phosphate compound containing lithium and a transition metal element. Among them, a compound containing at least one of nickel, iron, manganese, and cobalt is preferable for the positive electrode material. The chemical formula of this positive electrode material is expressed by, for example, $Li_xM1O_2$ or $Li_yM2PO_4$, where M1 and M2 represent at least one kind of transition metal elements, and "x" and "y" represent a value varied depending on a charging or discharging status of a battery, which typically satisfy 0.05≤x≤1.10 and 0.05≤y≤1.10.

Examples of the complex oxide composed of lithium and a transition metal element include a lithium cobalt complex oxide ($Li_xCoO_2$) and a lithium nickel complex oxide ($Li_xNiO_2$). Examples of the phosphate compound containing lithium and a transition metal element include a lithium iron phosphate compound ($LiFePO_4$), a lithium iron manganese phosphate compound ($LiFe_{1-u}Mn_uPO_4$ (0<u<1)). This is because higher battery capacity and excellent cycle performance are obtained using the positive electrode materials described above.

[Negative Electrode]

The negative electrode has a configuration similar to that of the above negative electrode 10 in FIG. 2, and, for example, has the negative electrode active material layers disposed on both faces of the current collector. The negative electrode preferably has a negative-electrode charge capacity larger than electrical capacitance (a battery charge capacity) provided by the positive electrode active material. This makes it possible to prevent precipitation of lithium metal on the negative electrode.

The positive electrode active material layer is formed partially on both faces of the positive electrode current collector. The negative electrode active material layer is also formed partially on both faces of the negative electrode current collector. Such a negative electrode may have, for example, an area at which the positive electrode active material layer is not present on the surface of the positive electrode current collector that the negative electrode active material layer faces. This area permits stable battery design.

The above area at which the positive and negative electrode active material layers do not face one another is hardly affected by charging and discharging. The status of the negative electrode active material layer is consequently retained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films. Examples of the synthetic resin include polytetrafluoroethylene, polypropylene, and polyethylene.

[Electrolytic Solution]

A part of the active material layers or the separator is impregnated with a liquid electrolyte (an electrolytic solution). This electrolytic solution is composed of electrolyte salt dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, methylpropyl carbonate, 1,2-dimethoxyethane, and tetrahydrofuran. Among these, ethylene carbonate, propylene carbonate, dimethyl carbonate, diethyl carbonate, or ethylmethyl carbonate, or the combination thereof is preferable. Such solvent enables better performances. In this case, the dissociation of electrolyte salt and ionic mobility can be improved by combined use of a viscous solvent, such as ethylene carbonate or propylene carbonate, and a non-viscous solvent, such as dimethyl carbonate, ethylmethyl carbonate, or diethyl carbonate.

For an alloyed negative electrode, the solvent preferably contains at least one of halogenated chain carbonate ester and halogenated cyclic carbonate ester. Such a solvent enables the negative electrode active material to be coated with a stable coating at discharging and particularly charging. The halogenated chain carbonate ester is chain carbonate ester having halogen as a constitutive element (at least one hydrogen is substituted by halogen). And the halogenated cyclic carbonate ester is cyclic carbonate ester having halogen as a constitutive element (that is, at least one hydrogen is substituted by halogen).

The halogen is preferably, but not limited to, fluorine, for fluorine enables the formation of better coating than other halogens do. A larger number of halogens is better, for a more stable coating can be obtained which reduces a decomposition reaction of an electrolytic solution.

Examples of the halogenated chain carbonate ester include fluoromethyl methyl carbonate, difluoromethyl methyl carbonate. Examples of the halogenated cyclic carbonate ester include 4-fluoro-1,3-dioxolane-2-one, 4,5-difluoro-1,3-dioxolane-2-one.

The solvent preferably contains an unsaturated carbon bond cyclic carbonate ester as an additive, for this enables the formation of a stable coating on a negative electrode at charging and discharging and the inhibition of a decomposition reaction of the electrolyte. Examples of the unsaturated carbon bond cyclic carbonate ester include vinylene carbonate and vinyl ethylene carbonate.

In addition, the solvent preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of the electrolytic solution. The acid anhydride may be, for example, propane disulfonic acid anhydride.

The electrolyte salt may contain, for example, at least one light metal salt such as lithium salt. Examples of the lithium salt include lithium hexafluorophosphate ($LiPF_6$), and lithium tetrafluoroborate ($LiBF_4$).

The content of the electrolyte salt in the solvent preferably ranges from 0.5 mol/kg or more and 2.5 mol/kg or less. Since this content enables high ionic conductivity.

[Method of Producing Laminate Film Lithium Ion Secondary Battery]

Firstly, a positive electrode is produced with the above positive electrode material. A positive electrode mixture is created by mixing the positive electrode active material with as necessary the binder, the conductive assistant agent, and other materials, and dispersed in an organic solvent to form slurry of the positive-electrode mixture. The mixture slurry is then applied to a positive electrode current collector with a coating apparatus such as a die coater having a die head or a knife roll, and dried by hot air to obtain a positive electrode active material layer. The positive electrode active material layer is finally compressed with, for example, a roll press. In this case, heating may be performed, and the heating or the compression may be repeated multiple times.

Secondly, a negative electrode active material layer is formed on a negative electrode current collector to produce a negative electrode through the same procedure as in the above production of the negative electrode 10.

In producing the positive electrode and the negative electrode, the active material layers are formed on both faces of the positive and negative electrode current collector. In both the electrodes, the length of these active material layers formed on the faces may differ from one another (See FIG. 2).

Then, an electrolytic solution is prepared. With ultrasonic welding, the positive electrode lead 32 is attached to the positive electrode current collector and the negative-electrode lead 33 is attached to the negative electrode current collector. The positive and negative electrodes and the separator interposed therebetween are stacked or wound to produce the wound electrode body 31 and a protecting tape is stuck to the outermost circumference of the body. The electrode body is flattened. The film-shaped outer part is folded in half to interpose the electrode body therebetween. The insulating portions of the outer part 35 are stuck to one another by heat sealing, thereby the wound electrode body is encapsulated with one direction is released. The close adhesion films are inserted between the outer part and the positive and negative electrode leads. The prepared electrolytic solution is introduced from the released side in a prescribed amount to perform the impregnation of the electrolytic solution under a vacuum. The released side is stuck by vacuum heat sealing. In this manner, the laminate film lithium ion secondary battery 30 is successfully produced.

EXAMPLE

Hereinafter, the present invention will be more specifically described by showing Examples and Comparative Examples, but the present invention is not limited to the following Examples.

Example 1-1

The laminate film lithium ion secondary battery 30 shown in FIG. 3 was produced by the following procedure.

The procedure began with the production of a positive electrode. A positive-electrode mixture was prepared by mixing 95 mass % of $LiNi_{0.7}Co_{0.25}Al_{0.05}O$ of lithium-nickel-cobalt complex oxide (lithium-nickel-cobalt-aluminum complex oxide: NCA) as a positive electrode active material, 2.5 mass % of a positive electrode conductive assistant agent, and 2.5 mass % of a positive electrode binder (polyvinylidene fluoride: PVDF). The positive-electrode mixture was dispersed in an organic solvent (N-methyl-2-pyrrolidone, NMP) to form paste slurry. The slurry was applied to both surfaces of a positive electrode current collector with a coating apparatus having a die head and dried with a drying apparatus of hot-air type. The positive electrode current collector used herein had a thickness of 15 µm. The resultant was finally compressed with a roll press.

Next, a negative electrode was produced. As a negative electrode active material, a mixed raw material of metallic silicon and silicon dioxide was introduced into a reaction furnace and evaporated under a vacuum atmosphere of 10 Pa to deposit the evaporated material on an absorbing plate. The deposit was taken out after it was sufficiently cooled, followed by pulverizing with a ball mill. After the particle diameter was adjusted, thermal CVD was performed, thereby forming a carbon material on the surface layer portion of the negative electrode active material particle. At this time, part of the negative electrode active material particles were taken out and subjected to XANES measurement as will be described below. Subsequently, the negative electrode active material particle, a precursor of a negative electrode binder (polyamic acid), Conductive assistant agent 1 (flake-like graphite), and Conductive assistant agent 2 (acetylene black) were mixed in a dried-mass ratio of 80:8:10:2, and then diluted with NMP to form pasty negative electrode mixture slurry. In this case, NMP was used as solvent for polyamic acid. Then, the negative electrode mixture slurry was applied onto the both sides of a negative electrode current collector with a coating apparatus, followed by drying. As this negative electrode current collector, roughened electrolytic copper foil (thickness=15 µm) was used. Finally, this was baked at 700° C. for 1 hour in a vacuum atmosphere. This carbonized a part of the negative electrode binder. This also formed negative electrode active material layers on the both sides of the negative electrode collector. In this case, the negative electrode current collector contained carbon and sulfur, and each content was 100 ppm by mass or less.

Subsequently, solvents (4-fluoro-1,3-dioxolane-2-one (FEC), ethylene carbonate (EC), and dimethyl carbonate (DMC)) were mixed, followed by dissolving electrolyte salt (lithium hexafluorophosphate ($LiPF_6$)) to prepare an electrolytic solution. In this case, the solvent composition was set to FEC:EC:DMC=10:20:70 in a volume ratio, and the content of the electrolyte salt was set to 1.0 mol/kg based on the solvent.

Then, a secondary battery was assembled as follows. First, an aluminum lead was attached to one end of the positive electrode current collector with ultrasonic welding, and a nickel lead was welded to one end of the negative electrode current collector. Subsequently, the positive electrode, a separator, the negative electrode, and a separator were laminated in this order, and wound in the longitudinal direction to produce a wound electrode body. The end of the winding was fixed with a PET protecting tape. The separator used herein was a laminate film (thickness: 12 µm) in which a film mainly composed of porous polyethylene was sandwiched by films mainly composed of porous polypropylene. Subsequently, the electrode body was interposed between outer parts, and then the outer edge of the outer parts was stuck to one another by heat sealing such that one of the four sides was opened, and the electrode body was entered therein. The outer part was an aluminum laminate film in which a nylon film, an aluminum foil, and a polypropylene film were laminated. Then, the electrolytic solution was introduced from the open side to perform the impregnation under a vacuum. The open side was then stuck by heat sealing.

On the secondary battery thus produced, the cycle performance were evaluated.

The cycle performance were investigated as follows. First, two cycles of charging and discharging were performed under an atmosphere of 25° C. to stabilize the battery and the discharge capacity in the second cycle was measured. Next, the cycle of charging and discharging was repeated until the total number of cycles reached 100 cycles and the discharge capacity was measured every cycle. Finally, a capacity retention rate was calculated by dividing the discharge capacity in the 100-th cycle by the discharge capacity in the second cycle. Incidentally, as the cycle condition, charging was performed at a constant current density of 2.5 $mA/cm^2$ until the voltage reached 4.2 V, and after the voltage reached 4.2 V, charging was performed at a constant voltage of 4.2 V until the current density reached 0.25 $mA/cm^2$. The discharging was performed at a constant current density of 2.5 $mA/cm^2$ until the voltage reached 2.5 V.

Subsequently, a 2032 type coin battery was assembled as a secondary battery for XAFS measuring test.

The negative electrode used was produced in the same way as in the negative electrode of the laminate film lithium ion secondary battery 30 in the evaluation of cycle performance described above. The electrolytic solution used was produced in the same way as in the electrolytic solution of the laminate film lithium ion secondary battery 30 in the evaluation of cycle performance described above.

The counter electrode used was a metallic lithium foil with a thickness of 0.5 mm. The separator had a thickness of 20 µm using polyethylene.

Then, a bottom cover of the 2032 type coin battery, the lithium foil, and the separator were piled up, and 150 mL of the electrolytic solution was poured thereinto. Subsequently, the negative electrode and a spacer (thickness: 1.0 mm) were piled up thereon, and 150 mL of the electrolytic solution was poured thereinto. Then, a spring and a top cover of the coin battery were assembled in this order, followed by caulking with an automatic caulking apparatus for a coin cell, whereby a 2032 type coin battery was produced.

Subsequently, Li was introduced into the negative electrode in an amount corresponding half of the fully charged capacity of this 2032 type coin battery. Then, the negative electrode was taken out from the coin battery and subjected to XANES measurement. In this way, a XANES spectrum at 50% charging was obtained. Incidentally, the XANES spectrum before charging was measured by using the particles immediately after "forming a carbon material on the surface layer portion of the negative electrode active material particle".

The conditions for measuring X-ray Absorption Fine Structure (XAFS) were as follows.

Place for measurement: Aichi Synchrotron Radiation Center BL7U acceleration energy: 1.2 GeV, accumulated current value: 300 mA, condition for monochromaticity: soft X-ray from an undulator was used for the measurement after being monochromatized with a grating spectroscope Condensation condition: condensation in vertical and horizontal directions with a toroidal mirror coated with Au Opening of slit: 75 μm at the entrance slit, 75 μm at the exit slit Beam size: 0.4 mm in horizontal direction, 0.1 mm in vertical direction Incident angle to sample: normal incidence (0°)

Energy calibration: calibrated with photoelectron spectrum of Au

Method for measuring $I_0$: Au-mesh

Circumstances of sample: transferred using a transfer vessel without exposing to the atmosphere basic degree of vacuum in the measuring vessel: $3 \times 10^{-9}$ Pa Comparative Example 1-1

Secondary batteries were produced and evaluated for the cycle performance by the same way as in Example 1-1 except for changing the existence and nonexistence of the peak in a range of 539 to 541 eV, together with the existence and nonexistence of the strongest peak at the vicinity of 532 eV. In this case, the existence and nonexistence of the peak in a range of 539 to 541 eV and so on were controlled by changing the conditions of producing the silicon oxide (changing the temperature of the silicon oxide gas, changing the gas that concurrently flows with the silicon oxide gas (an inert gas, a reduction gas), or changing the temperature of the absorbing plate). Table 2 shows the results of Example 1-1 and Comparative Example 1-1. Additionally, FIG. 1 shows XANES spectra in Example 1-1 and Comparative Example 1-1.

Additionally, a XANES spectrum was measured on $SiO_2$ as Reference. The result of Reference is also shown in FIG. 1. In FIG. 1, the XANES spectrum in Example 1-1 at 50% charging is also described. That is, FIG. 1 shows spectra in order of Reference ($SiO_2$), Comparative Example 1-1, Example 1-1 (before charging), and Example 1-1 (at 50% charging) from the top. In FIG. 1, the ordinate represents intensity (in arbitrary unit) and the abscissas represents energy (eV). In order to understand the position of peak, the range of 539 to 541 eV is hatched in FIG. 1. The energy (eV) of the abscissas in FIG. 1 corresponds to energy required to get an electron in K-shell of oxygen to jump to the outer shell. Although it is not exactly defined, it is considered that higher energy in the abscissas in FIG. 1 implies higher bond energy between oxygen and other atom such as silicon, in which an electron in K-shell of oxygen is basically hard to jump.

TABLE 2

| | Peak in 539-541 eV | Strongest peak at 532 eV | Capacity retention rate at 100th cycle |
|---|---|---|---|
| Comparative Example 1-1 | None | None | 65 |
| Example 1-1 | Exist | Exist | 78 |

$SiOx\ x = 1$, $D_{50} = 5$ μm, positive electrode: NCA, carbon covering layer exist 100 nm As can be seen from FIG. 1, there are a plurality of peaks in higher energy range in Reference ($SiO_2$), Comparative Example 1-1, and Example 1-1 (before charging). In particular, the strongest peak was shown at 538 eV in Reference ($SiO_2$) and Comparative Example 1-1. In XANES measurements, the XANES spectrum shifts to higher energy as the distance between Si—O is linger, with the oxygen having higher valence number. On the other hand, the strongest peak was shown at lower energy range (532 eV) in Example 1-1 (before charging). The peak at 532 eV indicates a state in which the bond energy between an oxygen atom and a silicon atom is lowest (lower than that of a peak at 538 eV or in a range of 539 to 541 eV), and it is presumed that the peak at 532 eV is due to a higher ionic Si—O bond. In this case, the higher ionic Si—O bond is liable to occlude Li. As a result, the peak at 532 eV was disappeared and the peak at 534 eV was generated at 50% charging. The peak at 534 eV is probably due to a Li—O bond. It is to be noted that the peak in the vicinity of 532 eV existed also in Reference ($SiO_2$) and Comparative Example 1-1, but the peaks in the vicinity of 532 eV in these Examples had intensity weaker than that of the corresponding peak at 538 eV. That is, the peak in the vicinity of 532 eV was not strongest in these Examples. In the peak in higher energy range, $SiO_2$ did not have a peak in the range of 539 to 541 eV. The peak in the range of 539 to 541 eV did not exist also in Comparative Example 1-1. On the other hand, the peak in the vicinity of 538 eV existed strongly in both of Reference ($SiO_2$) and Comparative Example 1-1. Accordingly, it is presumed that the Si—O bond in Comparative Example 1-1 was in a state close to $SiO_2$. As a result, the battery property was unfavorable as shown in Table 2. On the other hand, there was a peak at 540 eV (i.e., in the range of 539 to 541 eV) in Example 1-1 (before charging). Accordingly, the battery property was favorable as shown in Table 2.

Examples 2-1 and 2-2, Comparative Examples 2-1 and 2-2

Secondary batteries were produced and evaluated for the cycle performance under the same conditions as in Example 1-1 except for controlling the oxygen amount in the bulk of the silicon compound. The results are shown in Table 3. In this case, the oxygen amount was controlled by changing the ratio of metallic silicon and silicon oxide in the raw material of the silicon compound or the heating temperature.

TABLE 3

| | $SiO_x$ x= | Peak in 539-541 eV | Strongest peak at 532 eV | Capacity retention rate at 100th cycle |
|---|---|---|---|---|
| Comparative Example 2-1 | 0.3 | None | — | 69 |

$D_{50} = 5$ μm, positive electrode: NCA, carbon covering layer exist 100 nm

TABLE 3-continued

D$_{50}$ = 5 μm, positive electrode: NCA,
carbon covering layer exist 100 nm

|  | SiO$_x$ x= | Peak in 539-541 eV | Strongest peak at 532 eV | Capacity retention rate at 100th cycle |
|---|---|---|---|---|
| Example 2-1 | 0.5 | Exist | Exist | 74 |
| Example 1-1 | 1 | Exist | Exist | 78 |
| Example 2-2 | 1.5 | Exist | Exist | 79 |
| Comparative Example 2-2 | 1.8 | — | — | Cannot evaluated |

The oxygen amount of SiO$_x$ was changed, and the evaluation results revealed insufficient oxidation and lower cycle performance when "x" was 0.3. When "x" was 1.8, the oxidation proceeded excessively to increase the resistance, and the battery could not be evaluated thereby.

Examples 3-1 to 3-6

Secondary batteries were produced and evaluated for the cycle performance under the same conditions as in Example 1-1 except for changing the median diameter of the negative electrode active material particles. The results are shown in Table 4.

TABLE 4

SiOx x = 1, peak in 539-541 eV: existed,
strongest peak at 532 eV: existed, positive electrode:
NCA, carbon covering layer exist 100 nm

|  | Particle diameter μm | Capacity retention rate at 100th cycle |
|---|---|---|
| Example 1-1 | 5 | 78 |
| Example 3-1 | 0.3 | 71 |
| Example 3-2 | 0.5 | 75 |
| Example 3-3 | 1 | 76 |
| Example 3-4 | 10 | 80 |
| Example 3-5 | 20 | 78 |
| Example 3-6 | 30 | 72 |

When the particle diameter of the negative electrode active material particles was 0.5 μm or more, the surface area was successfully prevented from increasing, and the battery retention rate tended to be better thereby. It was found that when the particle diameter was 20 μm or less, the negative electrode active material particle became less expandable in charging and less breakable, thereby making it possible to improve the battery properties.

Examples 4-1 to 4-6

Secondary batteries were produced and evaluated for the cycle performance under the same conditions as in Example 1-1 except for changing the thickness of the carbon material. The results are shown in Table 5.

TABLE 5

SiOx x = 1, peak in 539-541 eV: existed, strongest peak at 532
eV: existed, positive electrode: NCA, D$_{50}$ = 5 μm

|  | Thickness of carbon covering layer nm | Capacity retention rate at 100th cycle |
|---|---|---|
| Example 1-1 | 100 | 78 |
| Example 4-1 | 0 | 73 |
| Example 4-2 | 5 | 76 |
| Example 4-3 | 50 | 78 |
| Example 4-4 | 200 | 78 |
| Example 4-5 | 1000 | 79 |
| Example 4-6 | 5000 | 79 |

The thickness of the carbon material was changed to evaluate the battery properties. As a result, without depositing a carbon material, the battery retention rate was lowered. It is presumed that carbon materials have effect to prevent decomposition of part of the electrolytic solution. The battery properties are stabilized when the carbon material increases the thickness, but it becomes difficult to improve the battery capacity as the carbon material becomes thicker. The battery capacity became difficult to improve when the thickness was about 5 μm (5000 nm). When the carbon material had a thickness of about 7 μm, the experiment less exhibited the capacity. Judging from these results as a whole, it is considered that the thickness of the carbon material is desirably 5 μm or less.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A negative electrode active material comprising
a negative electrode active material particle having: (i) a peak in a range of 539 to 541 eV in a XANES spectrum that is obtained by XANES measurement of the negative electrode active material particle, and (ii) a strongest peak at the vicinity of 532 eV in the XANES spectrum; wherein
the negative electrode active material particle exhibits a decrease in the strongest peak at the vicinity of 532 eV in occlusion of Li,
the negative electrode active material particle exhibits a peak generated at the vicinity of 534 eV in the XANES spectrum in occlusion of Li, wherein
Li is inserted into a Si—O bond to reduce at least part of Si—O bonds and to form a Li—Si bond or an O—Li bond, and
the peak at the vicinity of 532 eV is attributable to Si—O bonds which contribute to occlusion of Li; and
the negative electrode active material particle comprises a silicon compound shown by SiO$_x$, where 0.5≤x≤1.6 wherein
the silicon compound comprises a silicon dioxide (SiO$_2$) component and a silicon (Si) component.

2. The negative electrode active material according to claim 1, wherein a median diameter of the negative electrode active material particle is 0.5 μm or more and 20 μm or less.

3. The negative electrode active material according to claim 1, wherein the negative electrode active material particle has a surface layer portion containing a carbon material.

4. The negative electrode active material according to claim 3, wherein a median diameter of the negative electrode active material particle is 0.5 μm or more and 20 μm or less.

5. The negative electrode active material according to claim 3, wherein an average thickness of the carbon material is 5 nm or more and 5000 nm or less.

6. A negative electrode comprising the negative electrode active material according to claim 1.

7. A lithium ion secondary battery, comprising the negative electrode according to claim 6 as a negative electrode.

8. A method of producing the negative electrode active material according to claim 1, the method comprising:
   preparing negative electrode active material particles each containing the silicon compound; and
   selecting the negative electrode active material particle having: (i) the peak in the range of 539 to 541 eV in the XANES spectrum and (ii) the strongest peak at the vicinity of 532 eV in the XANES spectrum.

9. A method of producing a lithium ion secondary battery, comprising:
   producing a negative electrode active material using the method according to claim 8,
   producing a negative electrode using the negative electrode active material, and
   producing a lithium ion secondary battery using the negative electrode.

10. The negative electrode active material according to claim 1, wherein the peak in the range of 539 to 541 eV is attributable to the Si—O bond.

11. The method according to claim 8, wherein the peak in the range of 539 to 541 eV is attributable to the Si—O bond.

* * * * *